Feb. 24, 1970   C. H. WILLSEY   3,497,052
EGG HANDLING MACHINE
Filed July 10, 1967   6 Sheets-Sheet 4
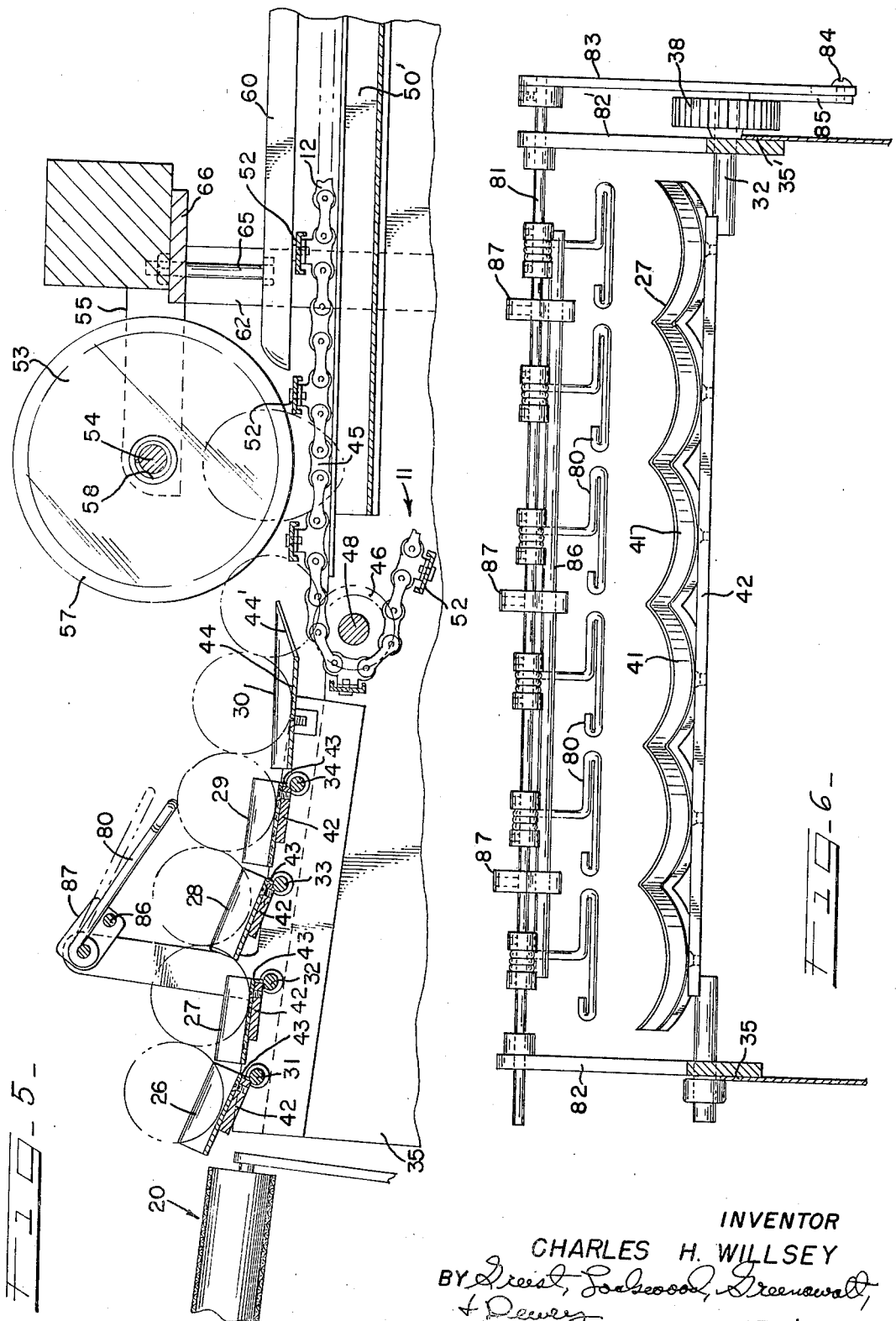
INVENTOR
CHARLES H. WILLSEY
BY Drost, Lockwood, Greenawalt, & Dewey
ATT'YS.

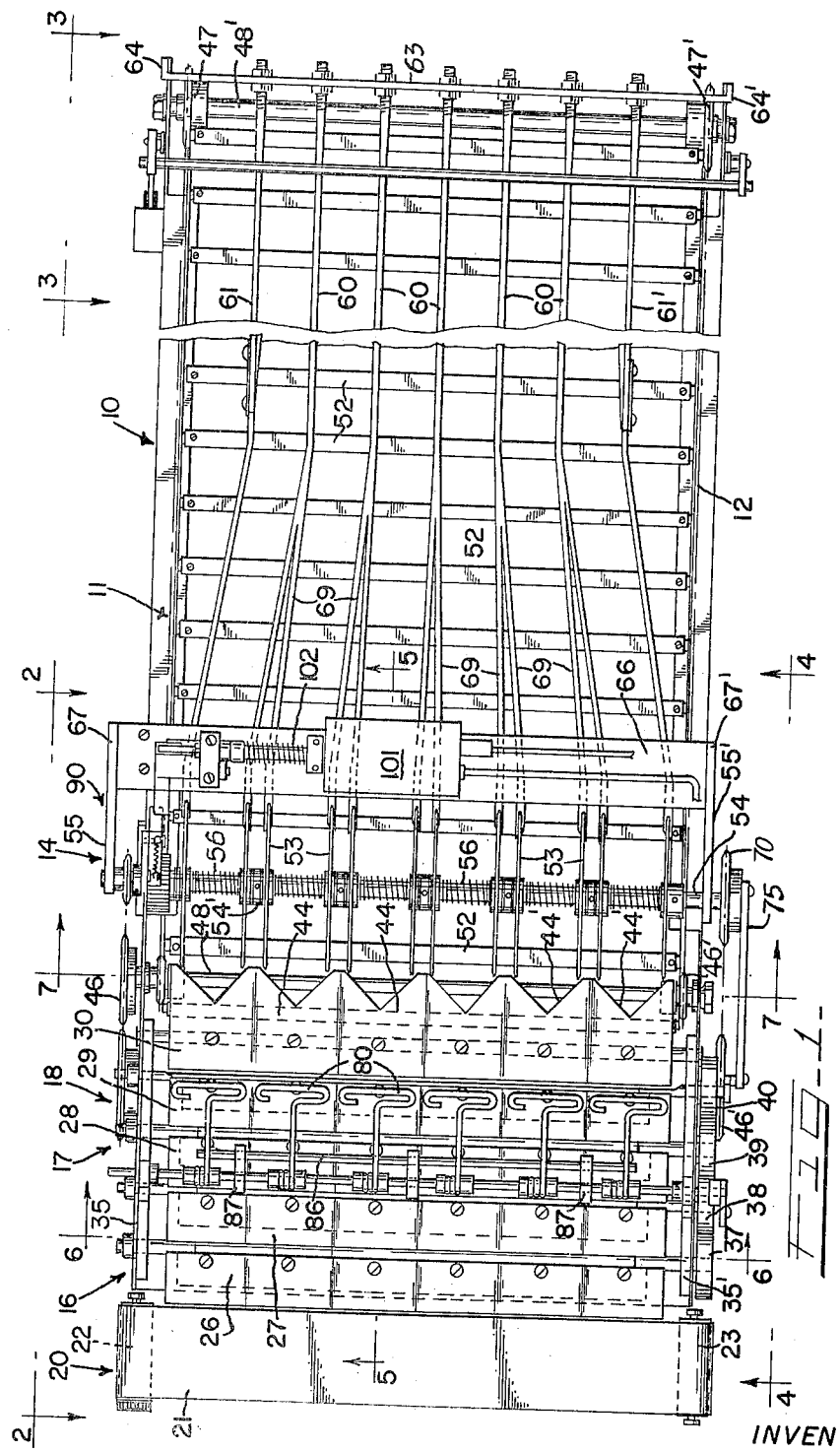

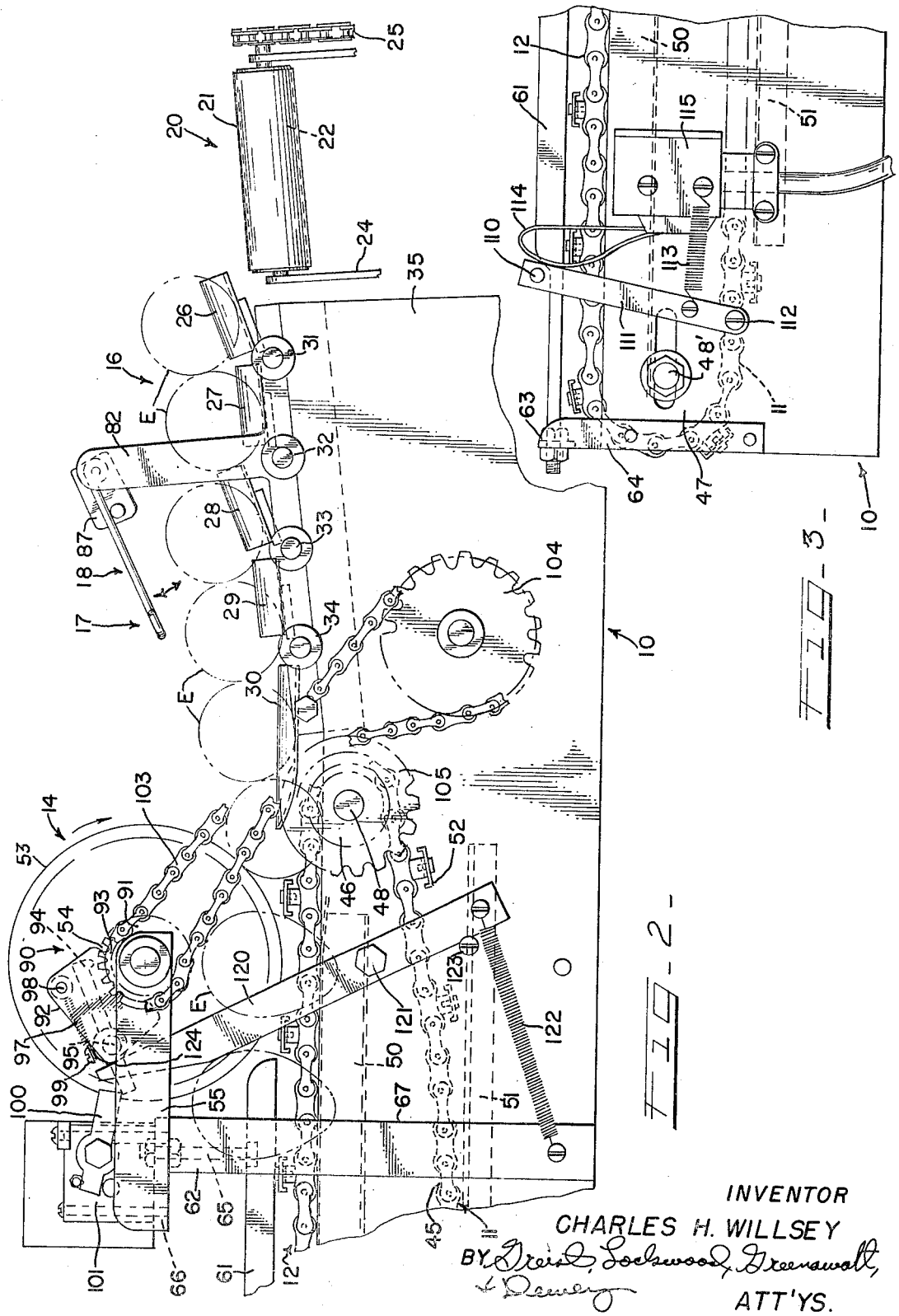

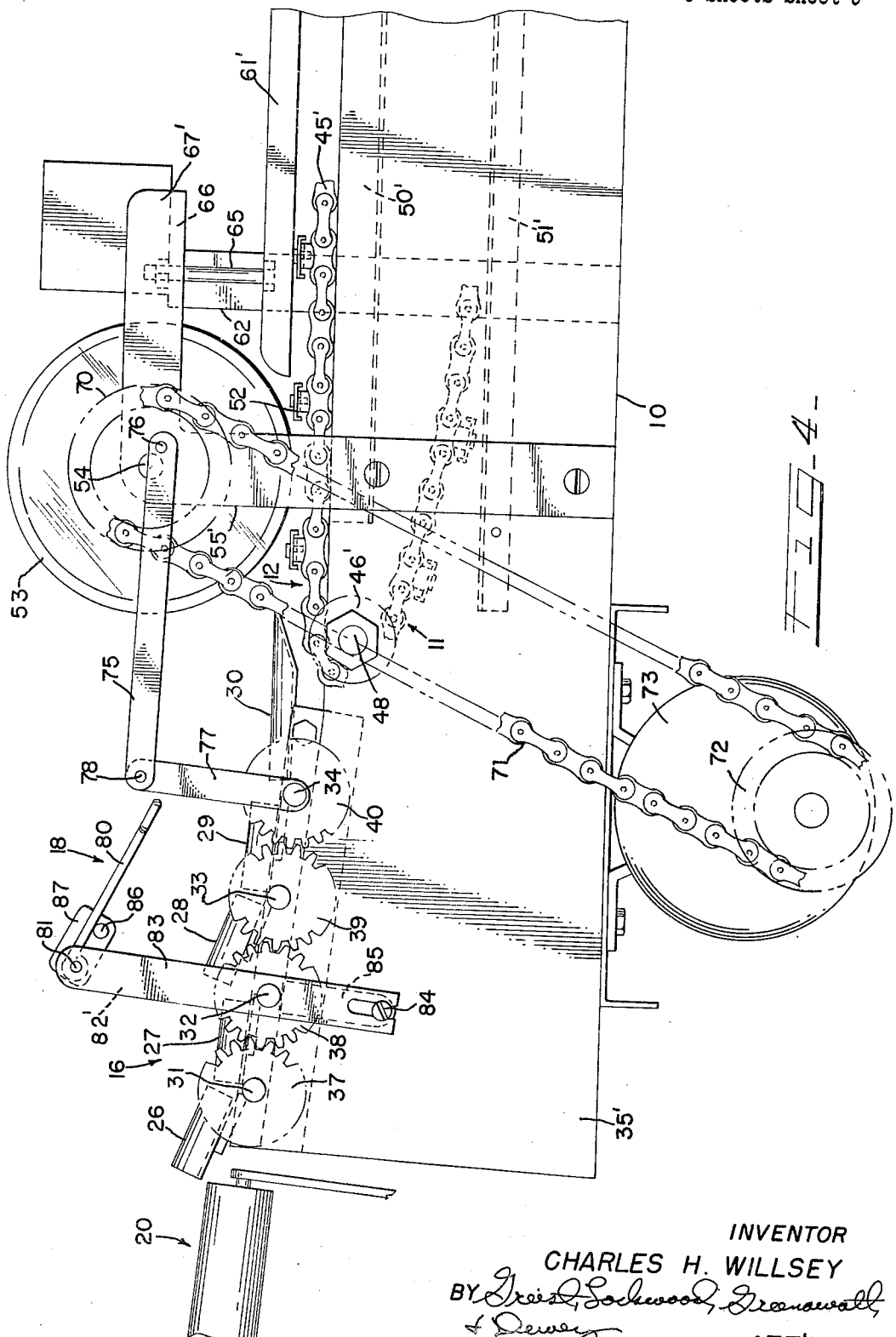

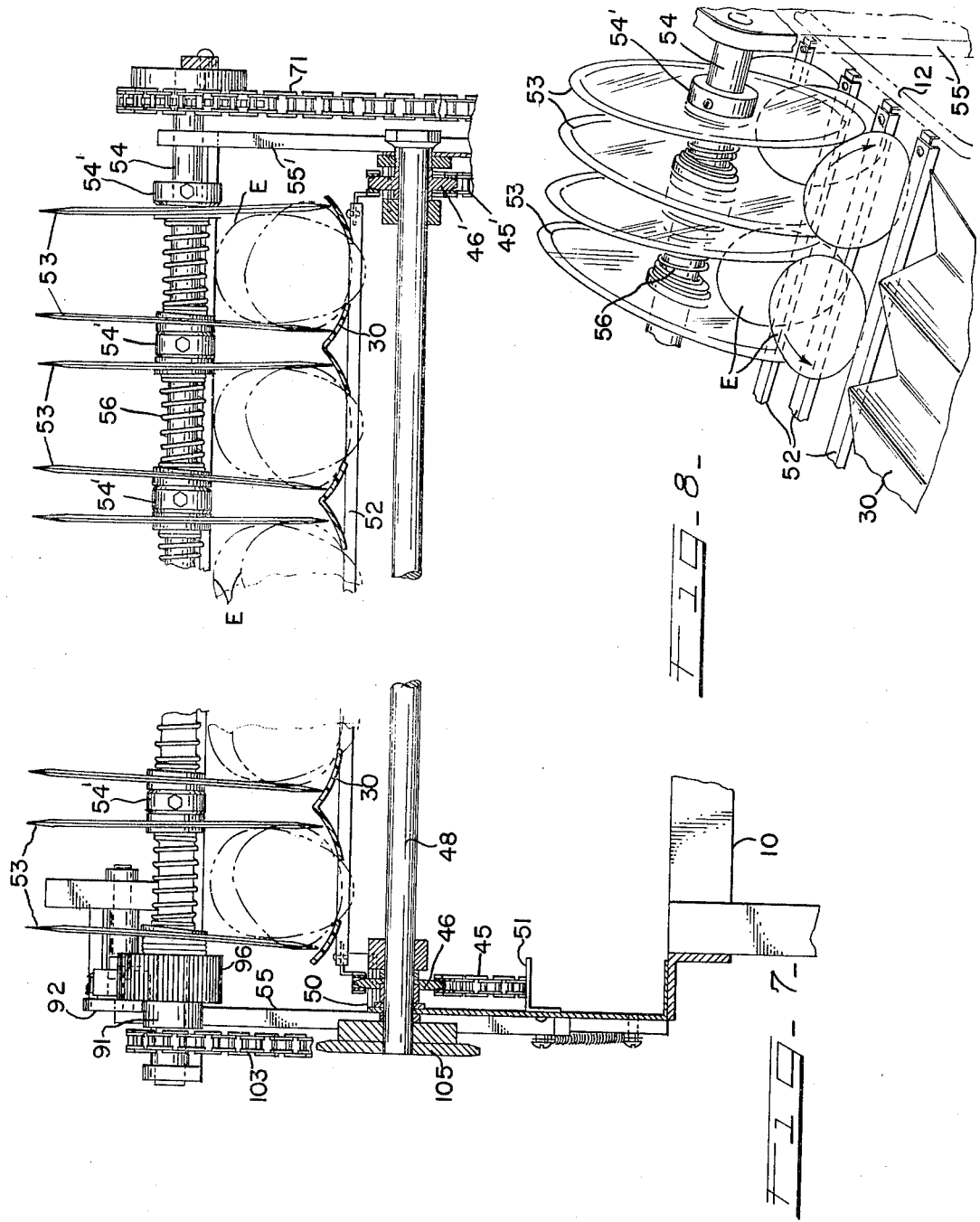

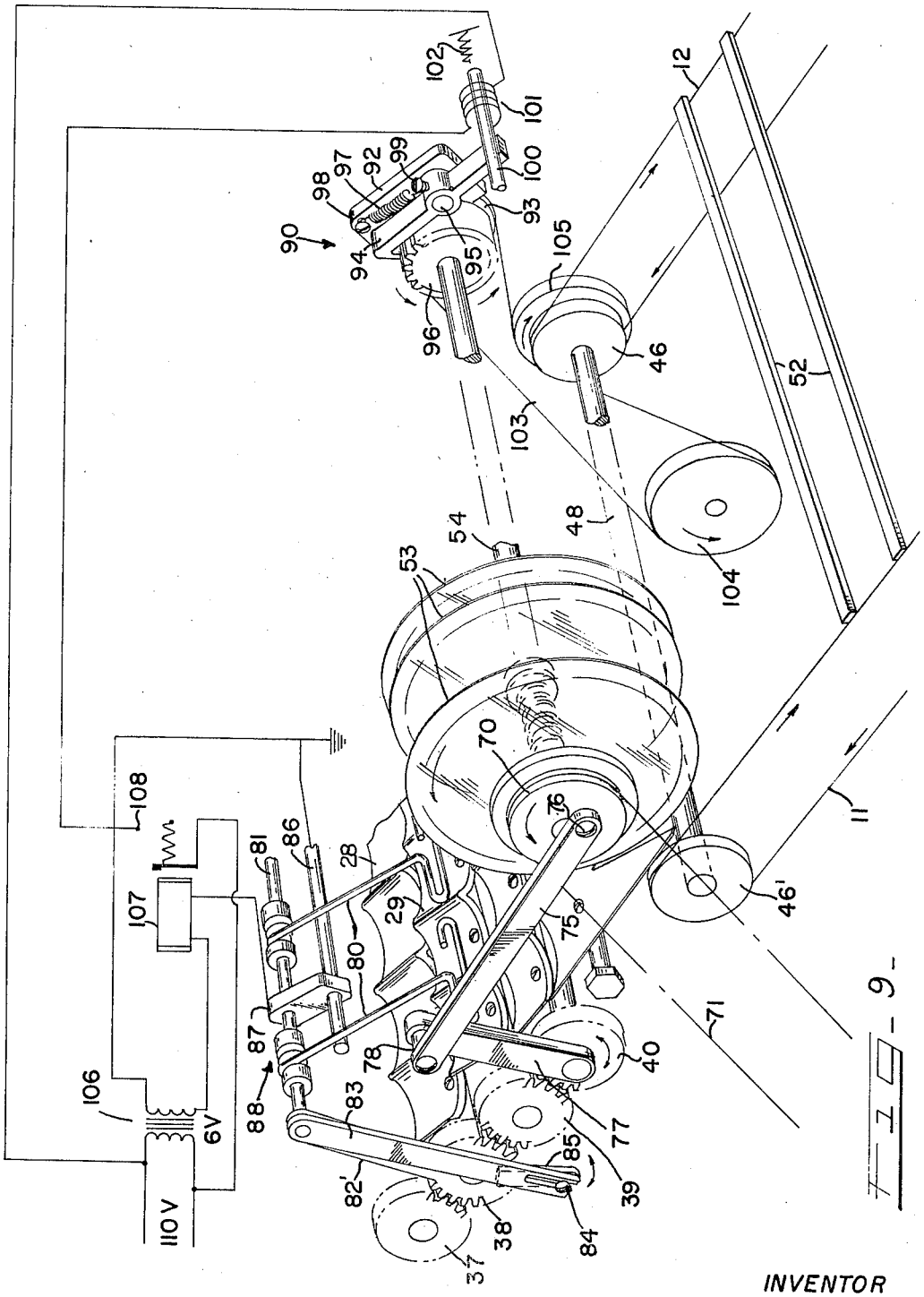

United States Patent Office 3,497,052
Patented Feb. 24, 1970

3,497,052
EGG HANDLING MACHINE
Charles H. Willsey, Topeka, Kans., assignor, by mesne assignments, to Seymour Foods, Inc., Topeka, Kans., a corporation of Delaware
Filed July 10, 1967, Ser. No. 652,190
Int. Cl. B65g 47/24
U.S. Cl. 198—33                                    21 Claims

ABSTRACT OF THE DISCLOSURE

Semi-automatic apparatus for arranging eggs in successive rows on a conveyor for transfer to cartons, filler flats or other containers or handling equipment which comprises an intermittently driven endless conveyor having pocket forming means for receiving successive rows of the eggs in random arrangement on a top horizontal run thereof, a rotating disc mechanism mounted above the conveyor top run adjacent the receiving end thereof and co-operating therewith to cause the eggs to be arranged uniformly in the conveyor pockets and in longitudinal and transverse row alignment with the small ends down as they advance along the receiving end of the conveyor, and an inclined feed table having aligning and sensing mechanism for receiving the eggs in random arrangement and permitting them to advance by rolling down guide channels in the inclined surface of the feed table to a sensing station where their advance is arrested by eggs previously fed so that they are positioned beneath transversely aligned sensing arms which are operative, when there is a full transverse row of the eggs present at the station, to actuate the drive mechanism for the conveyor thereby to advance a preceding row of the eggs onto the conveyor where they pass beneath the rotating disc mechanism, and to free the row of eggs at the sensing station for advance towards the receiving end of the conveyor so as to automatically repeat the cycle of operations when sufficient eggs are supplied to the feed table.

This invention relates to apparatus for supporting and positioning articles for packing or other operations and is more particularly concerned with improvements in equipment for receiving eggs or egg-shaped articles in random arrangement and for positioning the same uniformly and in row arrangement.

In the handling of eggs in commerce it is frequently necessary or desirable to arrange or position the eggs uniformly and in rows for various operations. For example, it has been found expedient in packaging eggs in cartons and in crates which employ filler flat supporting and separating means, to arrange the eggs in uniformly spaced rows in the pockets of a conveyor with the long axis of the egg vertical and the smaller end on the bottom. Various equipment has been designed for use in this connection which has included mechanism for automatically arranging the eggs in uniform position and in row formation with the small ends on the bottom. However, much of this equipment is not satisfactory because of slow speed operation, excessive breakage and frequent failure to properly position the eggs uniformly. It is a general object, therefore, of the present invention to provide an improved apparatus for receiving eggs in random arrangement from a collecting line, a washer or a grader or other source and for delivering the eggs to the horizontally disposed top run of a conveyor on which the eggs are arranged in uniform position and in transverse and longitudinal row alignment so as to facilitate the transfer of the eggs in groups of a predetermined number to packing containers or other equipment.

It is a more specific object of the invention to provide in an egg handling machine an egg receiving conveyor having an upper horizontally disposed run which is provided with means forming pockets in longitudinal and transverse row alignment and an orienting mechanism arranged above the conveyor run which is operative to engage the surfaces of successive eggs or similar ovoid shaped articles so as to cause the eggs to assume a uniform position in transverse and longitudinal row alignment on the conveyor, together with an inclined, sectionalized and channeled feed table positioned at the entrance end of the conveyor across which the eggs are advanced by gravity, the table having associated therewith a transverse row of sensing devices aligned with longitudinally extending guide channels in the table which sensing devices are operative to actuate the drive for the conveyor when there is a full transverse row of eggs beneath the sensing devices so as to cause a previously fed row of eggs to be moved onto the conveyor and thereby allow the row at the sensing devices to advance toward the conveyor and free the sensing devices for actuation of the conveyor drive by the next succeeding row of eggs.

It is another object of the invention to provide a conveyor for eggs having pocket formations which are transversely and longitudinally aligned and associated eggs orienting means mounted above a horizontally disposed run of the conveyor for engaging rows of eggs fed beneath the same and for biasing the eggs to a uniform position in row alignment in the pockets of the conveyor, and a feed table at the entrance end of the conveyor which is inclined toward the latter so as to permit the eggs to roll in successive steps to a sensing station at which a series of sensing devices are located, with the sensing devices being operative, when a full row of eggs is present at the sensing station, to actuate the conveyor drive and advance the same so that a row of previously fed eggs will move onto the conveyor and the eggs which are at the sensing station will be freed to advance beyond the same thereby clearing the way for a succeeding row of eggs to operate the sensing devices.

It is a further object of the invention to provide in an egg handling machine a horizontally disposed traveling conveyor having means thereon for supporting an egg with the long axis thereof extending generally transversely of the path of advance of the conveyor and with the egg resting on spaced points on its periphery which are in a vertical plane extending generally longitudinally of the path of the conveyor and a pair of axially spaced rotating discs mounted above the conveyor in longitudinally extending, generally parallel vertical planes which discs are spaced for engagement of the peripheral edges thereof with the uppermost surfaces of successive eggs at opposite ends thereof so as to bias the eggs to a position with the long axis vertical and the small end on the bottom.

These and other objects and advantages of the invention will be apparent from a consideration of the egg handling machine which is shown by way of illustration in the accompanying drawings wherein:

FIGURE 1 is a plan view, with portions broken away, of an egg handling machine which incorporates therein the principal features of the invention;

FIGURE 2 is a side elevation taken on the line 2—2 of FIGURE 1 at the infeed end of the machine shown in FIGURE 1, the view being to an enlarged scale;

FIGURE 3 is a side elevation taken on the line 3—3 of FIGURE 1 at the discharge end of the machine as shown in FIGURE 1, the view being to an enlarged scale;

FIGURE 4 is a partial side elevation taken on the line 4—4 of FIGURE 1, at the opposite side of the machine;

FIGURE 5 is a longitudinal section taken on the line 5—5 of FIGURE 1, to an enlarged scale;

FIGURE 6 is a cross section taken on the line 6—6 of FIGURE 1, to an enlarged scale and with portions broken away;

FIGURE 7 is a cross section taken on the line 7—7 of FIGURE 1, to an enlarged scale and with portions broken away;

FIGURE 8 is a fragmentary perspective view illustrating the operation of the egg orienting discs; and FIGURE 9 is a perspective view, largely schematic, illustrating the driving arrangements for the machine and the control therefor.

Referring first to FIGURES 1 and 2 of the drawings, there is illustrated a machine which is especially adapted to be used in preparing eggs for transfer to cartons, filler flats or other containers or handling equipment. The illustrated apparatus comprises an upright supporting frame 10 having a conveyor 11 mounted thereon with a horizontally disposed top run 12 on which the eggs E are adapted to be arranged in longitudinal and transverse row alignment, for convenient removal in groups or rows with six eggs in each transverse row. At the entrance end of the conveyor run 12 there is arranged an egg orienting mechanism 14 which is operative to engage successive eggs in each line thereof as they advance onto the conveyor run 12 and to cause the eggs to assume a uniform position with the long axis of each egg vertical and the small end thereof on the bottom. The eggs are delivered to the conveyor top run 12 across an inclined feed table 16 having oscillating, transversely extending channeled sections which are given an oscillating movement so as to advance or hand down the eggs by gravity to the receiving end of the conveyor. The eggs E are advanced in steps in longitudinal lines to a sensing station at 17 where the eggs in each line are halted temporarily if there are eggs in the line ahead of the same. When there is a full transverse row halted at the sensing station 17 an associated sensing mechanism 18 is operated by the presence of the full row of eggs to actuate a drive for the conveyor 11 so as to advance the leading row of eggs on the table 16 onto the conveyor top run 12 and permit the succeeding rows, including the row at the sensing station 17, to advance by gravity along the table, the conveyor being advanced step-by-step as successive rows of eggs are accumulated at the station 17. A scrambling conveyor 20 is arranged at the infeed end of the table 16 over which the eggs pass or onto which they are delivered initially. The conveyor 20 has alternate back and forward movement in a transverse path for insuring that there is no jamming of the eggs which are delivered to the same and that the eggs are fed to longitudinally aligning channels in the table 16.

The scrambling conveyor 20 which initially receives the eggs comprises an endless belt 21 (FIGURES 1, 2 and 4) of substantial width which is mounted on end support rollers 22 and 23. The support rollers 22 and 23 are journaled in a suitable manner in a support frame indicated at 24 which may be supplemental to the frame 10 or part of the framing for the apparatus which supplies eggs to the machine. This may be, for example, a washer, a grader or the like. The conveyor 20 extends transversely of the frame 10 at the infeed end of the machine and is connected with a drive as indicated at 25 which is operated so as to reverse the travel of the belt at relatively short intervals thereby providing an oscillating movement which agitates the eggs delivered to the top run thereof and insures that they will roll onto the adjoining table structure 16.

The table structure 16 (FIGURES 1 and 2) is provided with a sectionalized surface which is made up of a plurality of pad-like members mounted for rocking movement as hereinafter described. The scrambling conveyor 20 is at a higher level than the top run 12 of the conveyor 11 at the infeed end thereof and the table structure 16 which extends between the conveyor 20 and the infeed or receiving end of the conveyor 11 is inclined downwardly in the direction of the conveyor run 12. The table 16, in the illustrated form of the machine, has four movable sections or pad members 26, 27, 28 and 29 (FIGURES 1, 2 and 4) and a fixed pad section 30 which is located immediately adjacent the infeed end of the conveyor run 12. Each of the pad members or table sections 26, 27, 28 and 29 is of identical construction and each is mounted in the same manner on cross shafts or rock bars 31, 32, 33 and 34 which are journaled in the frame side plates 35 and 35' and are equally spaced, longitudinally of the machine. The rock bars 31, 32, 33 and 34 carry at their ends spur gears 37, 38, 39 and 40 which are in toothed engagement so that rocking or oscillating movement is imparted to all the pad members 26, 27, 28 and 29 simultaneously in a predetermined pattern or cycle of operation, with each pad member moving in a direction about its axis which is opposite that of the adjacent pad members and with alternate pad members moving in like paths, that is, when pad members 26 and 28 swing upwardly in a path above the table surface the pad members 27 and 29 swing in a path of the same character but in the downward direction. Each of the rocking or oscillating pad members 26, 27, 28 and 29 comprises a bent plate member which extends between the side frame plates 35 and 35' and has substantial width with each pad shaped or bent as shown in FIGURE 6 so as to provide a scalloped-like configuration in section and dividing the same into a series of connected channel forming sections 41 each of which provides an upwardly opening concave surface forming a rather shallow channel or trough extending in a direction longitudinally of the machine or transversely of the supporting axis of the pad section. The eggs are received from the conveyor 20 in the channel formations 41 of the first pad member 26 when the trailing edge is at the bottom most position, with the surface aligned with the surface of the belt 21, and the eggs roll across the pad member 26 with the eggs tending to assume a position in which the long axis extends in a direction generally transverse of the machine. Each of the pad members 26, 27, 28 and 29 is attached to a narrow plate or bar 42 (FIGURE 5) which is in turn attached to the cross bar or rock shaft adjacent the leading edge thereof with the pad member having a downturned flange as indicated at 43. Each of the pad members 26, 27, 28 and 29 is divided into six channels 41, in the form of the machine shown, so as to provide for the advance of the eggs in six longitudinally extending rows through the machine. The pad members 26, 27, 28 and 29 are each mounted at their leading edge on the associated supporting cross bar or shaft 31, 32, 33 and 34 so that when the trailing edge is raised a predetermined amount by rotation of the supporting shaft through a relatively small arc, the trailing edge of the pad member serves to halt the advancing movement of eggs which are rolling down the preceding pad member. When the trailing edge of the pad member is lowered into alignment with the leading edge of the preceding pad member the eggs on the preceding pad member are freed for advancing movement across the lowered pad member. The shafts are oscillated so as to provide for alternate rotative movement of the successive pad members 26, 27, 28 and 29, as previously described. Thus, when pad members 27 and 29 are rotated so that the trailing edges are elevated eggs on the pad members 26 and 28 are held against advancing movement and when the trailing edges of the pad members 27 and 29 are lowered the eggs on the pad members 26 and 28 are free to advance by gravity onto the pad members 27 and 29, respectively. Oscillation of the pad members 26 and 28 in the same manner, with alternate timing, results in a "hand-me-down" movement of the eggs from the first pad member 26 to the non-movable last pad member 30. The fixed pad member 30 is divided in the direction transversely of the machine into channel forming sections 44 which are aligned with the corresponding channel sections 41 of the pad members 26, 27, 28 and 29 with each section having a V-shaped cutout 44' at its leading edge so that the pad has a sawtooth leading edge formation. The non-movable pad member 30 has a width which will accommodate two rows of eggs. As the eggs roll down the table 16 to the pad member 30 two rows of six eggs each will accumulate on the pad member 30 with the eggs in the respective channel formations abutting each other and preventing the advance of eggs from the pad member 29 until the leading row on the pad member 30 is advanced onto the conveyor top run 12. When the conveyor run 12 is at a standstill position the leading row of eggs on the pad member 30 cannot advance. The conveyor run 12 is advanced a step at a time so as to receive successive leading rows of eggs from the fixed pad member 30 on the table 16. Thus the advance of the leading row of eggs from the pad member 30 to the conveyor 12 occurs only upon advancing movement of the conveyor 11 which is controlled by the sensing apparatus 18 in a manner hereinafter described.

The conveyor 11 comprises a pair of side chains 45, 45' (FIGURES 1 to 4) mounted on axially spaced pairs of end sprockets 46, 46' and 47, 47' which are carried on transverse shafts 48 and 48', respectively, the latter being journaled in the frame side plates 35 and 35' in longitudinally spaced relation. Upper and lower runs of the chains 45, 45' are supported on longitudinally extending guide bars 50, 50' and 51, 51' which are secured to the side plates 35, 35' so that both top and bottom runs of the conveyor 12 are disposed in a generally horizontal plane. The chains 45 and 45' are connected by longitudinally spaced cross bars 52 with adjacent cross bars being spaced apart a distance somewhat less than the small diameter of an average size egg so that an egg positioned between any pair of the bars 52 with its long axis extending transversely of the conveyor will be supported at spaced points on the periphery which are approximately in the plane of the short axis of the egg and the egg will be free to pivot in a plane corresponding approximately to the plane of its long axis. When a normal egg is positioned on a pair of bars in this manner or otherwise supported in a similar manner the long axis will normally extend at a small angle to the horizontal with the small end of the egg lowermost.

An egg orienting or positioning apparatus 14 is mounted at the entrance end of the conveyor 12 which comprises six sets or pairs of plate-like disc members 53 (FIGURES 1, 4, 5, 7 and 8) mounted on a transverse shaft 54 which is journaled in the upper ends of upright bracket members 55 and 55' which are secured to the side plates 35 and 35' and which project above the top level of the top run 12 of the conveyor 11. Each pair of the plates 53 is separated from the adjoining pair on the shaft 54 by a collar 54' secured on the latter and the plates of each pair thereof are normally held apart by a compression spring 56 extending between the same. The plates 53 of each pair thereof are aligned with the channel formations 41 in the table 16 and the plate-like discs 53 of each pair are normally spaced apart a distance somewhat less than the long dimension of an average size egg. Each of the plates or discs 53 is formed of a plastic, for example, a vinyl, with a tapered edge as indicated at 57 and with a center aperture 58 of somewhat larger diameter than the diameter of the supporting shaft 54 so that each plate 53 may move axially on the shaft 54 and may tilt to a limited degree relative to the axis of the shaft 54 against the force of the separating spring 56 (FIGURES 7 and 8). Preferably, also, the plates 53 have some degree of flexibility. The shaft 54 is located above the level of the top run of the conveyor 11 so that an egg of average size carried on the conveyor 11 between a pair of adjacent cross bars 52 and passing from a channel formation of the feed table pad member 30 will pass beneath a pair of the discs 53 with the short axis of the egg in a vertical plane extending approximately longitudinal of the conveyor and somewhere near the center of the space between the pair of plates and will be engaged on its uppermost surface by the peripheral edges of the pair of discs 53. The resilient pressure resulting from the mounting of the plates on the shaft 54 and the force of the separating spring 56 will result in the egg being biased to a position on the conveyor with its larger end uppermost. The edges of the spaced rotating discs 53 will engage the egg adjacent its ends on opposite sides of its short axis and due to the difference in surface curvature the greater component of force will be applied to the smaller end causing the latter to move down with resulting upward movement of the larger end. As the conveyor is indexed forward the eggs are advanced in longitudinal lines or rows by moving the same between longitudinally extending bars or rod members 60, 61 and 61' which are spaced laterally of the conveyor frame and supported on end frames 62 and 63. The end frame 63 which is remote from the orienting mechanism 14 is upstanding above and supported on end brackets 64, 64' attached to the side plates 35 and 35'. At the end adjacent the orienting mechanism 14 the bars 60, 61 and 61' are suspended by hanger bolts 65 from a cross plate 66 mounted on side brackets 67 and 67' forming a cross frame 62. The outside bars 61 and 61' are tapered or bent outwardly to align with the end discs 53 while the intermediate bars 60 are bifurcated at the ends, as indicated at 69, and bent so as to align with the intermediate orienting discs 53 and provide longitudinally extending guideways for holding the eggs with the long axis in a vertical position while bringing them into compact transverse rows with spacing corresponding to the required spacing for pick up by a lifter mechanism (not shown) or for packing in a carton or a filler flat.

The shaft 54 (FIGURES 1 to 5 and 9) which carries the orienting discs 53 has a sprocket 70 mounted at the one end which is connected by a chain 71 with the drive sprocket 72 on a motor drive unit 73 supported on a suitable mounting beneath the frame 10. The shaft 54 is driven at a uniform rate with a predetermined number of revolutions per minute. A crank arm 75 has one end pinned at 76 to the gear 70 and transmits reciprocating motion to the spur gear 40 controlling the hand-me-down pad member 29 on the feed table 16 through a radial extension 77 (FIGURES 4 and 9) on the gear 40 which is pivoted at 78 to the other end of the crank 75. The spur gear 40 meshes with the spur gears 39, 38 and 37 which control the oscillation of the hand-me-down pad members 26, 27 and 28.

The egg sensing and conveyor control mechanism 18 (FIGURES 1 to 4, 6 and 9) which is associated with egg supporting hand-me-down pad member 29 on the feed table 16 comprises a series of switch operating arms 80 each of which is aligned above a longitudinal channel formation 41 on the pad member 29 and extends forwardly from a supporting cross bar or shaft 81, so as to overlie an egg on the pad member 29. The shaft 81 is journaled in a pair of upstanding brackets 82 and 82' mounted on the side plates 35 and 35' and is connected at the one end to the upper end of a vertically disposed crank arm 83 (FIGURE 4) which has a slot and pin connection 84 at the lower end with a radial arm 85 on the spur gear 38 so that oscillation of the gear 38 results in an oscillating movement of the switch arms 80 which is opposite in direction to the oscillating movement of the pad member 29 beneath the free ends of the same. That is, when the pad member 29 is on a downward swing the switch arms 80 are on an upward swing and moving out of contact with the eggs and when the pad member 29 is on an upward swing the switch arms 80 are on a downward swing and an egg on the pad member 29 will engage an arm 80 and raise the same a sufficient amount to break contact with the cross rod 86 which extends between non-conducting holder blocks 87, on the shaft 81 and constitutes part of a multi-switch assembly, indicated at 88, in an electrical control circuit which is illustrated in FIGURE 9. Thus the contact arms 80 of the switch assembly 88 do not interfere with the forward movement of the eggs on the pad member 29 when the eggs are not held back by eggs in the line ahead, the hinged leading edge of the pad member 29 being at the level of the trailing edge of the fixed pad member 30 and there being nothing to obstruct the advance of the individual eggs in the absence of eggs immediately ahead in the line on the pad member 30.

The conveyor 12 is advanced a step at a time by its drive mechanism which is actuated through an electric circuit including the normally closed switch assembly 88. The constantly driven shaft 54 (FIGURES 1, 2 and 9) carries at the end opposite the drive sprocket 70 a subassembly 90 which is mounted on shaft 54 so that the shaft 54 may turn without turning the sub-assembly. The sub-assembly 90 consists of a collar 91, plate member 92 and a sprocket 93 together with a dog 94 mounted on the pin 95 extending from the plate member 92 and positioned in toothed engagement with a gear 96 which is pinned to the shaft 54. The dog 94 is biased into engagement with the gear 96 by spring 97 anchored to the plate 92 at 98 and connected to the dog 94 at 99. The dog 94 is normally held out of engagement with the gear 96 by plunger 100 of the solenoid 101. When the plunger 100 is retracted by operation of the solenoid 101 against the force of the spring 102 which normally holds it extended, the dog 94 under the influence of the spring 97 engages the teeth of the gear 96 and the entire subassembly 90 rotates with the shaft 54. A drive chain 103 extends from the sprocket 93 to over an idler sprocket 104 and back over a sprocket 105 fixed on the end of the conveyor shaft 48. When the assembly 90 rotates with the shaft 54 it drives the conveyor 12. The assembly 90 makes a single rotation when the dog is engaged and returns to the idle position. Preferably, a positive means of disengaging the dog 94 is provided by lever 120 (FIGURE 2) which is pivoted to the frame at 121 with the tail end pulled by tension spring 122 against a stop 123 when the assembly 90 is in the idle position and with the other end exerting a force at 124 against the assembly 90 so as to pivot the same in a slightly clockwise direction in FIGURE 2, with the result that the dog is raised to assure it will stay clear of the gear. This eliminates any tendency for the dog to chatter against the gear.

As shown in FIGURE 9, a simple electric circuit is superimposed on the mechanical drive means for the conveyor 11 which is supplied with current from a 110 volt line and through the transformer 106 as a 6 volt leg with the switch assembly 88 and the relay 107 having a contact indicated at 108 in a 110 volt leg of the circuit which controls the operation of solenoid 101. The switch assembly 88 controlling the relay 107 operates as six switches contacted in parallel and normally closed through the switch arms 80 contacting the switch bar 86. All six switches must be opened by raising the contact arms 80 out of engagement with the bar 86. This occurs when there are six eggs on the pad member 29 below the arms 80. Normally, there will be two transverse rows of eggs accumulated on the fixed pad member 30 before there is a full row of six eggs on the pad member 29. As the eggs accumulate on the pad member 29 the switch arms 80 are raised to break contact with the switch rod 86 upon upward oscillation of the pad member 29. When there is a full row of eggs on the pad member 29 the relay 107 will be operated momentarily and the solenoid plunger 100 will be retracted permitting the dog 94 to engage with the gear 96 thereby advancing the conveyor 11 with the leading row of eggs on the fixed pad member 30 being received between a pair of the cross bars 52. This frees the succeeding rows of eggs for advance towards the conveyor 11 including the row on the pad 29 which has operated the switch assembly 88. The cycle of operation is repeated at the leading row of eggs on the fixed pad member 30 advanced forward onto the conveyor 11.

The basic purpose of the rocking or oscillating pad members 26, 27, 28 and 29 in the feed table 16 is to provide intermittent step-by-step advance of the eggs in longitudinally aligned formation or rows. The trailing edge of each pad member serves as an egg stop when it is in its upper or raised position. As the pad member moves to lower the trailing edge into the normal plane of the table the eggs are permitted to roll by gravity to the edge of the next pad member which has been raised to stop forming position. This is repeated until the eggs reach the line of pads directly below the sensing arms 80 where the advance of the eggs is interrupted by abutting engagement with the preceding eggs, which, in normal operation, are present in the two rows accumulated on the fixed pad member 30. When there are six eggs on the pad member 29 all the switch arms 80 are raised which actuates the drive mechanism for the conveyor 11 and the leading row of eggs on the pad member 30 advances onto the top run of the conveyor. The egg sensing switch arms are constantly oscillating with the movement timed so that the direction is opposite that of the direction of movement of the pad members 29. The switch arms 80 may be adjusted on the shaft 81 to break the electrical contact with bar 86 by a wide margin of movement so that substantial variations in size of the eggs will not affect operation of the switch arms in controlling the electrical circuit. Also, this movement eliminates pressure by switch arms 80 on the eggs which might otherwise interfere with gravity advance of the same, enabling the eggs to advance without any holdback effect by the switch arms. Since there is a release of all pressure from the switch arms at regular intervals any egg on the pad member 29 which is not retarded by an egg in the preceding line will automatically move ahead and fill the row ahead independently of the indexing mechanism. This serves to accommodate irregularities in egg rolling caused by slight misplacement of the eggs or extreme shell malformation. If an egg which is free to advance from the pad member 29 does not do so for any reason an incomplete row may advance to the conveyor 11. When five more eggs move onto the vacant channels of the pad member 29 the switch assembly 88 will be operated to advance the conveyor. The egg which has not moved off of the pad 29 with the preceding row is not likely to remain on the pad 29 since there will be pressure from eggs in the line which follow it sufficient to push it ahead. Consequently, under normal conditions full rows of eggs are automatically fed to the conveyor as long as an adequate supply of eggs is maintained at the infeed edge of the table 16.

In operating the machine eggs are delivered to the reciprocating belt conveyor 20 and, urged by the movement of the belt, roll at random into the channels 41 of the first pad member 26 on the feed table 16. The oscillating pad members advance the eggs in hand-me-down fashion across the table 16 toward the infeed end of the conveyor where the leading eggs come to rest against a conveyor cross bar 52 halted adjacent the leading edge of the fixed pad member 30. The eggs are guided in longitudinal lines by the aligned channels 41 of the pad members. The third egg in each line will be halted on the pad member 29 at the sensing station 17 and will operate to prevent full downward swing of the sensing arm 80 which is aligned with the channel 41 in which the egg is positioned thereby breaking contact with switch bar 86. When there is a full transverse row of eggs present at the sensing station 17 the conveyor drive is actuated to advance the top run a distance sufficient to advance the leading row of eggs onto the conveyor 11. Subsequent step-by-step advance of the conveyor 11 through operation of the row sensing mechanism 18 carries the eggs beneath the orienting mechanism 14 where the eggs are biased by operation of the orienting plates 53 to a position with their long axis generally vertical and the smaller ends on the bottom. The guide bars 60, 61 and 61' hold the eggs in this position while they are advanced by further movement of the conveyor 11 to a position where they can be removed from the conveyor 11 either manually or automatically for packing or the like. In order to avoid overloading of the conveyor 11 a limit or stop bar 110 (FIGURES 1 and 3) is provided at the end of the top run of the conveyor which forms part of a frame 111 pivoted at 112 for swinging movement. The bar 110 is urged by tension spring 113 in the direction of the forward end of the conveyor so that it is normally in the path of eggs on the conveyor. The frame 111 engages the operating arm 114 of a stop switch 115 which is connected into the electrical power circuit (FIGURE 9) so as to interrupt the advance of the conveyor 11 when actuated. When the bar 110 is moved by an advancing line of eggs so as to operate the switch 115 the machine stops until the line of eggs is removed.

While particular materials and specific details of construction are described in connection with the form of the machine illustrated, it will be understood that other materials and equivalent structural details may be resorted to within the spirit of the invention.

I claim:

1. Apparatus for handling shell eggs comprising a conveyor having a generally horizontal run and means for receiving and supporting thereon successive eggs with the long axes thereof extending in a direction generally transverse of the path of advance of the conveyor and with each egg resting on spaced points on its circumference which are approximately in the plane of the short axis thereof so that the egg is free to tilt about said spaced points in a plane generally transverse of the conveyor path, and means mounted above the conveyor run for engaging the topmost surface of the egg at points adjacent opposite ends thereof and for exerting a downward force thereon as the egg is carried beneath the same by the conveyor thereby to bias the smaller end of the egg lower and the larger end higher so that each egg is positioned on the conveyor with the larger end uppermost.

2. Apparatus as set forth in claim 1, and said means for engaging the topmost surface of each egg comprising a pair of spaced, generally parallel, plate-like disc members having peripheral edges which are positioned to engage portions of the egg surface as an egg is advanced beneath the same by the conveyor.

3. Apparatus as set forth in claim 2, and said plate-like disc members being mounted for rotation on an axis extending transversely of the conveyor.

4. Apparatus as set forth in claim 3, and said plate-like disc members being mounted so that they may tilt relative to their axis of rotation when engaging an egg.

5. Apparatus as set forth in claim 2, and said plate-like disc members being mounted on a shaft extending transversely of the conveyor and resilient means urging said disc members apart while permitting tilting thereof on said shaft so that the peripheral edges will resiliently engage the uppermost surfaces of an egg as it is advanced beyond the same.

6. Apparatus as set forth in claim 1, and said means for engaging the egg comprising a pair of plate-like circular members, a supporting cross shaft for said plate-like members, said plate-like members being mounted on said shaft so that they may tilt relative to the axis of the supporting shaft and a compression spring normally holding said plate-like members in generally parallel relation and separated a distance which is less than the longest dimension of an average size egg.

7. Apparatus as set forth in claim 1, and said conveyor having co-operating guide means extending from said egg engaging means for holding the eggs in row alignment with each egg having its long axis extending in the same direction.

8. Apparatus for handling shell eggs comprising an egg supporting conveyor having longitudinally spaced, generally parallel cross members mounted thereon and traveling in a generally horizontal path, adjacent cross members forming egg receiving pockets between their spaced edges so that an egg may be supported in a pocket between successive cross bars with its long axis disposed in a plane extending transversely of the path of the conveyor and its short axis disposed in a plane extending generally in the direction of advance of the conveyor, and with the egg engaging the cross bars at spaced circumferential points on the egg surface and being free to rotate about an axis extending generally in the direction of advance of the conveyor, means for delivering eggs into the pockets of the conveyor in random arrangement with the long axis of each egg generally horizontal, and means disposed above the path of the conveyor and operative in generally parallel, vertical planes for yieldingly engaging the top surfaces of successive eggs at points adjacent the ends thereof as the conveyor advances the eggs beneath said means whereby each egg is rotated to a position in the conveyor pocket where its long axis is disposed generally vertical and the smaller end of the egg is at the bottom thereof.

9. Apparatus for handling eggs comprising a conveyor having a horizontally disposed run, means on said conveyor for supporting eggs in transverse row alignment with each egg being adapted to rest on said means so that it is free to pivot about an axis extending generally longitudinal of the conveyor, pairs of spaced plate-like disc members mounted on a transverse shaft above said conveyor run, the disc members of each pair thereof being mounted on the shaft so that each egg received on the conveyor will pass between the marginal portions of a pair of said disc members with the edges of said marginal portions adapted to yieldingly engage the top surface of the egg on opposite sides of the plane of the short axis of the egg thereby to bias the egg to a position with the long axis extending in a generally vertical plane and the small end lowermost, and means for delivering successive rows of eggs to the conveyor for advancing movement beneath said discs.

10. In an apparatus for handling eggs which comprises a driven endless conveyor having a horizontally disposed run with spaced cross bars mounted so as to support eggs in transverse row alignment, each egg being adapted to rest between adjacent cross bars so that it is free to pivot about an axis extending generally in a direction longitudinally of the conveyor, means for delivering eggs in transverse row alignment to the conveyor, pairs of spaced plate-like disc members mounted on a transverse shaft above the conveyor run, the disc members of each pair thereof being constructed and arranged on said transverse shaft so that each egg received on the conveyor will pass between the marginal portions of a pair of said disc members with the edges of said marginal portions adapted to yieldingly engage the top surface of the egg on opposite sides of the plane of the short axis of the egg when an egg is disposed on the conveyor with its long axis extending generally transverse of the path of movement of the conveyor thereby to cause the egg to pivot to a position with the long axis extending in a generally vertical plane and the small end lowermost.

11. In an apparatus as set forth in claim 10, and said disc members having marginal portions which are somewhat flexible so as to limit the pressure exerted on the eggs as they pass beneath the disc members and are engaged by the peripheral portions thereof while exerting sufficient force to pivot the eggs to vertical position.

12. In an apparatus as set forth in claim 10, and said disc members being mounted on said transverse shaft so that they are normally disposed in generally parallel planes separated a predetermined distance which is less than the length of an egg of average size and free to tilt relative to the axis of said shaft, and spring means normally holding said discs in said planes while permitting the peripheral edges thereof to be moved apart against the force of said spring means when engaged with the surface of an egg passing beneath the same.

13. In an apparatus as set forth in claim 10, and means for driving said conveyor and said transverse shaft so as to advance successive rows of eggs and rotate said disc members.

14. An egg accumulating apparatus comprising an endless traveling conveyor having transversely extending members which are spaced so as to support successive rows of eggs on a horizontally disposed run of the conveyor, a drive means for the conveyor, an egg receiving feed table having its top surface inclined downwardly in the direction of said horizontal conveyor run, said feed table having transversely spaced guide formations to which eggs are delivered for advance by gravity along said table toward said conveyor run, the lower end of said feed table top surface terminating at the receiving end of said horizontally disposed conveyor run, said feed table having means for accumulating eggs in longitudinal and transverse alignment so as to form transverse rows of a predetermined number, the advance of the leading row of eggs at the lower end of the feed table being arrested by a transversely extending member on the conveyor when the conveyor is halted, and a sensing mechanism at a sensing station on said feed table which is disposed for sensing eggs in a row thereof which is spaced relative to the position occupied by said leading row and which is operative to actuate the drive for the conveyor so as to advance the conveyor step-by-step, with each advance of the conveyor causing the transversely extending member holding the leading row of eggs to be advanced so that the leading row of eggs advances onto the conveyor by gravity, said sensing mechanism including means which senses when a full row of eggs is present at said sensing station on said feed table and which then actuates the conveyor drive to advance the leading row onto the conveyor and to free the row at the sensing station for advancing movement by gravity.

15. An egg accumulating apparatus as set forth in claim 14, and said feed table comprising a plurality of transversely extending narrow plate members having transversely spaced trough formations which are aligned longitudinally of the apparatus so as to arrange eggs delivered to the infeed end of the machine in rows extending transversely and longitudinally of the apparatus.

16. An egg accumulating apparatus as set forth in claim 15, and said plate members being mounted at the leading edge thereof on rock shafts extending transversely of the apparatus.

17. An egg accumulating apparatus as set forth in claim 16, and means for oscillating said rock shafts in alternate directions so as to cause the eggs to advance in successive steps along said table.

18. An egg accumulating apparatus as set forth in claim 14, and said feed table having transversely extending oscillating sections with aligned egg guiding troughs extending longitudinally of the apparatus which are operative to form the eggs into longitudinal and transverse row alignment.

19. An egg accumulating apparatus comprising an endless traveling conveyor having transversely extending members which are spaced so as to support successive rows of eggs on a horizontally disposed run of the conveyor, a drive means for the conveyor, a feed table having its top surface inclined downwardly in the direction of said horizontal conveyor run, said table having transversely spaced guide formations to which eggs are delivered for advance by gravity across said table toward said conveyor run, said table having means for accumulating eggs in longitudinal and transverse alignment so as to form transverse rows of a predetermined number, the advance of the leading row on the table being arrested by a member on the conveyor when the conveyor is halted, and a sensing mechanism at a sensing station on said feed table which is operative to actuate the drive for the conveyor so as to advance the conveyor step-by-step with each advance of the conveyor causing the leading row of eggs to advance along the feed table, said sensing mechanism including means which senses when a full row of eggs is present at said sensing station on said table and which then actuates the conveyor drive to advance the leading row onto the conveyor and to free the row at the sensing station for advancing movement by gravity, and said feed table having a transversely extending pivoted section at said sensing station for accommodating a row of eggs thereon, means for oscillating said pivoted section, said sensing mechanism including transversely spaced, pivoted switch actuating arms disposed at said sensing station and means for oscillating said switch actuating arms in a direction opposite the movement of said pivoted feed table section.

20. An egg accumulating apparatus comprising an endless traveling conveyor having transversely extending members which are spaced so as to support successive rows of eggs on a horizontally disposed run of the conveyor, a drive means for the conveyor, a feed table having its top surface inclined downwardly in the direction of said horizontal conveyor run, said table having transversely spaced guide formations to which eggs are delivered for advance by gravity across said table toward said conveyor run, said table having means for accumulating eggs in longitudinal and transverse alignment so as to form transverse rows of a predetermined number, the advance of the leading row on the table being arrested by a member on the conveyor when the conveyor is halted, and a sensing mechanism at a sensing station on said feed table which is operative to actuate the drive for the conveyor so as to advance the conveyor step-by-step with each advance of the conveyor causing the leading row of eggs to advance along the feed table, said sensing mechanism including means which senses when a full row of eggs is present at said sensing station on said table and which then actuates the conveyor drive to advance the leading row onto the conveyor and to free the row at the sensing station for advancing movement by gravity, and said feed table having a plurality of transversely extending pivoted sections and a fixed section adjoining the infeed end of the conveyor, and means for oscillating said pivoted sections so as to hand the eggs down to the fixed table section for transfer across the same to the conveyor.

21. An egg accumulating apparatus comprising an endless traveling conveyor having transversely extending members which are spaced so as to support successive rows of eggs on a horizontally disposed run of the conveyor, a drive means for the conveyor, an egg receiving feed table having its top surface inclined downwardly in the direction of said horizontal conveyor run, said table having transversely spaced guide formations to which eggs are delivered for advance by gravity along said table toward the discharge end which is disposed adjacent said conveyor run, said table having a plurality of transversely extending plate members with egg guiding, transversely spaced troughs which are aligned longitudinally so as to guide the eggs into longitudinal row arrangement as they advance across said plate members and along said table, said plate members being mounted for oscillation about transverse axes so as to form successive transverse rows of a predetermined number and to advance the transverse rows step-by-step, the leading row of eggs being disposed in a position where advance thereof is arrested by a transversely extending member on the conveyor when the conveyor is halted, and a sensing mechanism at a sensing station on said feed table which is spaced from the discharge end of said table and which is operative to sense when a succeeding row is full of eggs and thereafter to actuate the drive for the conveyor so as to advance the conveyor step-by-step, with each advance of the conveyor causing the transversely extending member holding the leading row of eggs to be advanced so that the leading row of eggs advances onto the conveyor by gravity.

References Cited

UNITED STATES PATENTS

| | | | |
|---|---|---|---|
| 566,260 | 8/1896 | Wightman | 198—218 |
| 614,529 | 11/1898 | Bonta | 198—218 |
| 3,179,230 | 4/1965 | Brown | 198—28 |
| 3,311,216 | 3/1967 | Jones | 198—30 |
| 2,908,375 | 10/1959 | Hoover et al. | 198—33.1 |
| 3,169,354 | 2/1965 | Bliss et al. | 53—61 |
| 3,311,216 | 3/1967 | Jones | 198—30 |
| 3,369,644 | 2/1968 | Niederer | 198—33 |

RICHARD E. AEGERTER, Primary Examiner

U.S. Cl. X.R.

198—206, 218